United States Patent [19]

Okumura et al.

[11] 4,136,305
[45] Jan. 23, 1979

[54] POWER CONVERTER CONTROL APPARATUS

[75] Inventors: Yoshio Okumura, Katsuta; Genichi Matsumoto, Hitachi; Kyozo Tachibana, Ibaraki; Yoshio Nozaki, Katsuta, all of Japan

[73] Assignee: Hitachi, Ltd., Japan

[21] Appl. No.: 845,723

[22] Filed: Oct. 26, 1977

[30] Foreign Application Priority Data

Nov. 4, 1976 [JP] Japan .................. 51/131784

[51] Int. Cl.² ............................................. H02P 3/14
[52] U.S. Cl. ................................ 318/376; 318/375; 318/381; 318/367
[58] Field of Search ............. 318/367, 375, 376, 381, 318/493; 363/68; 105/61

[56] References Cited

U.S. PATENT DOCUMENTS

| 3,735,220 | 5/1973 | Renner et al. ................... 318/376 |
| 4,020,411 | 4/1977 | Tsuboi et al. ..................... 363/68 |
| 4,030,018 | 6/1977 | Tsuboi ............................ 363/68 |
| 4,061,948 | 12/1977 | Lamparter ....................... 318/376 |

OTHER PUBLICATIONS

W. U. Bohli, "Ge 4/4" Thyristor Locomotives, Nos. 611 to 620 of the Rhaetian Railways, Brown Boveri Review, 12-73, pp. 526-536.

Primary Examiner—Robert K. Schaefer
Assistant Examiner—M. K. Mutter
Attorney, Agent, or Firm—Craig & Antonelli

[57] ABSTRACT

A power converter control apparatus comprising continuously controlled converter units and on-off controlled converter units for effecting powering control and regenerative braking control of a DC motor, which is arranged to include a unit change circuit for generating unit changing operation signals in response to a command for instructing the number of the converter units to be rendered operative from a master controllerand conduction phase signals from a phase shifter. In accordance with the unit changing operation signals, the conduction phase signals from the phase shifter are applied as a gate signal to the continuously controlled converter units in response to a powering control or a regenerative braking command, while a minimum conduction phase signal is applied as a gate signal to the on-off controlled converter units in response to a powering control command signal and a maximum conduction phase signal including a commutation marginal angle in response to a regenerative braking command signal. On the other hand, the gate signals supplied to the continuously controlled converter units may be temporarily cut off by a gate cut-off circuit and at the same time the conduction phase in the output of the phase shifter may be restored.

6 Claims, 9 Drawing Figures

POWER CONVERTER CONTROL APPARATUS

BACKGROUND OF THE INVENTION

FIELD OF THE INVENTION

This invention relates to a power converter control apparatus for use with a power converter comprising a plurality of groups of converter units.

DESCRIPTION OF THE PRIOR ART

The power converter of this type, as illustrated specially in FIG. 6 as well as from p. 526 to p. 536 of December 1973 issue of the "Brown Boveri Review", is suitable for a power converter used with AC electric locomotives. In this type of the power converter, in order to prevent the communications installation or the like from being adversely affected by high harmonics current which might flow in the AC power supply side of the power converter, the DC output sides of a plurality of groups of converter units are connected in cascade. One group of the converter units provides the output voltages thereof subjected to continuous control, and the other group provides the outputs thereof subjected to on-off control. The changeover between both groups of the converter units causes the overall DC output voltage of the power converter to be continuously controlled.

An improvement providing a simple circuit capable of producing an operation command signal for performing switchover between the former and latter groups of converter units of the power converter of this type is disclosed in the U.S. Patent Application entitled "Power Converter Control System", filed by Y. Okumura, et al. The summary of the foregoing application will be described below. This improvement includes a counter in the unit change circuit which produces the unit changing operation signal for changing over both groups of the converter units. When the conduction phase signal from the phase shifter applied to the continuously controlled converter units reaches a minimum or a maximum conduction angle, the count of the counter is changed and it continues to count until the count thereof reaches a command for instructing the number of converter units to be rendered operative generated from a master controller. The count of the counter is decoded by a decoder which makes up the unit changing operation signal.

In the case where the power converter operates in a converter mode for powering control of a DC motor which is a load, it will be necessary to satisfy the following conditions in changing over the converter units:

(1) In order to prevent a composite DC output voltage of the converter units from being changed before and after the changeover operation between both groups of the converter units, it is necessary to effect the changeover operation at zero phase of the AC voltage or at the moment when the AC voltage changes in polarity.

(2) Since it takes some time before the conduction phase signal from the phase shifter is restored to a maximum from a minimum conduction phase immediately after the changeover operation, it is necessary to cut off the output of the phase shifter for the corresponding period of time.

In the case of regenerative braking control, on the other hand, it will be necessary to satisfy the following conditions:

(1) In order to prevent an increase in the circuit current due to reduction in the counter electromotive force of the DC motor before and after the changeover operation or specific failure in commutation in the inverter mode, it is necessary to effect the changeover operation at a phase earlier than the maximum conduction phase by the time required for the changeover operation.

(2) Immediately after the changeover operation, it is necessary to cut off the output of the phase shifter for a period of time corresponding to the delay time in operation of the phase shifter.

In addition to the unit changing function of the cited U.S. Patent Application, the power converter control apparatus according to the present invention has a function satisfying the above-mentioned conditions of powering and regenerative braking controls.

SUMMARY OF THE INVENTION

An object of the present invention is to provide a power converter control apparatus capable of preventing a sudden change of a circuit current at the time of changeover operation between the continuously controlled converter units and the on-off controlled converter units and achieving a stable powering control in a converter mode and a stable regenerative braking control in an inverter mode.

According to the present invention, there is provided a power converter control apparatus in which the continuously controlled converter units receive an output of the phase shifter as a gate signal in accordance with a powering or regenerative braking command in response to the application of a unit changing operation signal, while the on-off controlled rectifier units receive a gate signal which acts as a minimum conduction phase signal and a maximum conduction phase signal in the case of powering control and regenerative braking, respectively. Further, at the time of changing over the converter units, the gate signal which is an output of the phase shifter is temporarily cut off and at the same time the conduction phase of the phase shifter is restored, thereby achieving the object of the present invention.

BRIEF DESCRIPTION OF THE DRAWINGS

FIGS. 2 and 3 are diagrams for explaining the circuit operation of FIG. 1, in which FIG. 2 shows one example of powering control operation and FIG. 3 shows one example of regenerative braking control operation.

DESCRIPTION OF THE PREFERRED EMBODIMENTS

Figure 1:
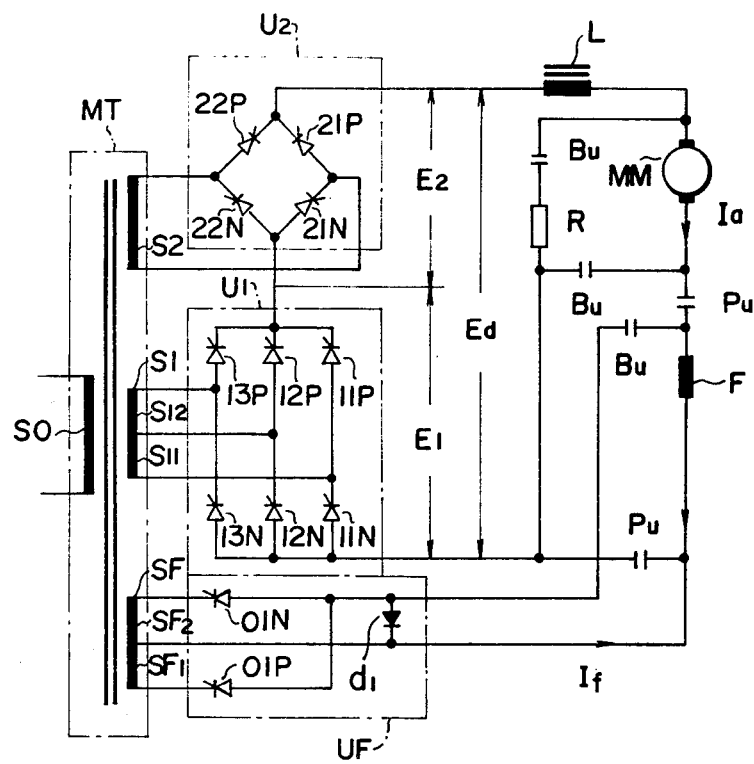
FIG. 1 is a diagram showing the main circuit arrangement of a power converter to which the present invention is applicable.

First, the main circuit arrangement of the power converter to which the present invention is applied will be described with reference to FIG. 1. The primary winding SO of a main transformer MT is connected to a single-phase AC power supply not shown. In the case of an electric car, an AC power supply is obtained from a trolley wire through the pantograph. The secondary winding of the main transformer MT is divided into three parts. The secondary winding SF is divided into SF1 and SF2 and connected to a field current control rectifier unit UF (hereinafter referred to simply as a thyristor unit UF) comprising a thyristor 01P fired and controlled during the positive half cycle of the AC power supply, a thyristor 01N fired and controlled during the negative half cycle, and a diode $d_1$. The secondary winding S1 has an intermediate tap and is divided into S11 and S12, and which intermediate tap is connected to a continuously controlled converter unit U1 (hereinafter referred to simply as a thyristor unit U1) comprising six thyristors 11P to 13P and 11N to 13N constituting a three-phase bridge circuit. In the thyristor unit U1, one arm is composed, for instance, of the thyristors 11P and 11N connected in series. The remaining secondary winding S2 is connected to an on-off controlled converter unit U2 (hereinafter referred to simply as the thyristor unit U2) including four thyristors 21P, 22P, 21N and 22N constituting a bridge circuit. The thyristor units U1 and U2 are connected in series to each other in a DC mode, and both the terminals of the series circuit of thyristor units U1 and U2 are connected to the field magnet F and the armature MM of a DC motor through a smoothing reactor L.

When a switch Pu is closed, the thyristor units U1 and U2 operate as a converter for powering control of the DC motor, and when a switch Bu is closed, the thyristor units U1 and U2 operate as an inverter for regenerative braking control of the DC motor. When the switch Bu is closed, a resistor R connected in parallel to the armature MM divides the armature current thereby to reduce a high harmonic current flowing into the power supply side of the power converter during the regenerative braking control operation.

The fundamental operation of powering control of the DC motor will be explained with reference to FIGS. 1 and 2. When the powering control is ordered, the switch Pu shown in FIG. 1 is closed, thereby making up a converter circuit of the thyristor units U1 and U2. The armature MM of the DC motor is thus connected in series to the field magnet F. At a point of time $t_0$ shown in FIG. 2, a control signal is applied to the thyristors 11P, 11N, 12P and 12N of the thyristor unit U1 in order to rectify the voltage of the secondary winding S11 of the main transformer MT, with the result that with the increase in speed, the DC output voltage $E_1$ is increased continuously, as apparent from time points $t_0$ to $t_1$ shown in FIG. 2. When the voltage $E_1$ reaches the level corresponding to a time point $t_1$ shown in FIG. 2, an arm changing signal $U_{12P}$ of the thyristor unit U1 causes commutation from the thyristors 12P and 12N to the thyristors 13P and 13N, thereby rectifying the voltage across the secondary winding S12 of the main transformer MT. When the voltage $E_1$ increases further and reaches the maximum level $E_{1m}$ at a time point $t_2$ as shown in FIG. 2, the thyristor unit U2 is turned on thereby to raise the DC output voltage $E_2$ up to the maximum level $E_{2m}$ at a time point $t_2$ as shown in FIG. 2. At the same time, the DC output voltage $E_1$ of the thyristor unit U1 is restored to zero from the maximum level $E_{1m}$. In this control process, the composite DC output voltage Ed remains unchanged at $E_{1m}$. (See the time point $t_2$ in FIG. 2.) From this state, the DC output voltage $E_1$ of the thyristor unit U1 is again increased continuously until the composite DC output voltage Ed becomes equal to $2E_{1m}$ at a time point $t_4$ as shown in FIG. 2.

Figure 3:
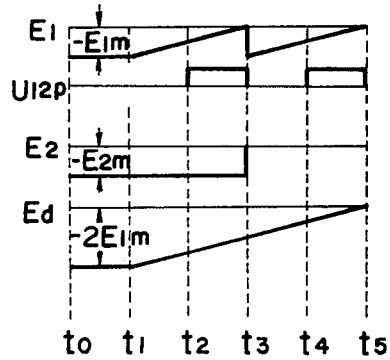

Now, explanation will be made of the fundamental operation of regenerative braking control with reference to FIGS. 1 and 3. In response to a regenerative braking command signal when the electric car, i.e., the DC motor is running at the maximum speed, only the switch Bu shown in FIG. 1 is turned on thereby to subject the field magnet F to separately-excited control by the thyristor unit UF. When the field current If is controlled, the thyristor units U1 and U2 are supplied with a gate control signal in an inverter mode, so that they produce the maximum counter electromotive forces of $-E_{1m}$ and $-E_{2m}$ respectively between the time points $t_0$ and $t_1$ as shown in FIG. 3. The result is that the counter electromotive force $-Ed$ produced by the armature MM is partly thermally consumed through the resistor R, the remainder being returned to the power supply through the main transformer MT. With the deceleration of the electric car, the counter electromotive force Ed is reduced between the time points $t_1$ and $t_2$ as shown in FIG. 3, and therefore it is necessary to reduce the voltage on the thyristor unit side correspondingly. Between the time points $t_1$ and $t_2$ as shown in FIG. 3, the voltage across the secondary winding $S_{11}$ of the main transformer MT is controlled thereby to continuously reduce the counter electromotive force $E_1$ of the thyristor unit $U_1$, followed by the arm switching in response to the arm-switching signal $U_{12P}$ of the thyristor unit U1 between the time points $t_2$ and $t_3$ as shown in FIG. 3, thereby regulating the voltage across the secondary winding $S_{12}$ of the main transformer MT. Finally when $E_1$ reaches zero level at the time point $t_3$ as shown in FIG. 3, the counter electromotive force $E_2$ of the thyristor unit U2 goes down to zero from the maximum level $E_{2m}$.

At the same time, the DC output voltage $E_1$ of the thyristor unit U1 is returned from zero to the maximum level $-E_{1m}$ again. In this way, the composite DC output voltage Ed (counter electromotive force Ed) remains unchanged at $-E_{1m}$ before and after the changeover operation of the thyristor units. Subsequently, with the decrease in speed, the DC output voltage $E_1$ of the thyristor unit U1 is continuously regulated until the composite DC output voltage Ed (counter electromotive force) is reduced to zero.

In order to effect the above-mentioned powering control or regenerative braking control, the thyristors of the respective thyristor units must be controlled in the manner mentioned below. First, the thyristor-controlled operation for powering control will be explained.

When the electric car is subjected to powering control, a gate signal must be applied to the thyristors 11N, 11P, 21N and 21P of the thyristor unit U1 to turn them on. Therefore, these thyristors are first supplied with a DC gate signal. Under this condition, the thyristors only function to bypass the DC current, so that the DC voltages $E_1$ and $E_2$ of the thyristor units U1 and U2 both stand at zero. Next, in order to increase the DC voltage $E_1$, the phase signal α is applied to the thyristors 12P and 12N to conduct them. In the process, the thyristor 11P (or 11N as the case may be) is cut off during the conduction of the thyristor 12P (or 12N as the case may be), making it necessary to eliminate the gate signal part corresponding to the conduction phase signal α. This partial elimination of the gate signal is required for preventing the reverse leakage current from being increased during the reverse voltage application to the thyristors.

When the conduction phase signal $\alpha$ is advanced in phase to such an extent that the whole voltage across the secondary winding $S_{11}$ of the main transformer MT comes to be rectified, this is detected. As a result, the thyristors 11P, 11N, 12P and 12N are fired at the minimum conduction phase (at $\alpha = 0$), while at the same time returning the conduction phase signal $\alpha$ from the minimum to the maximum level sharply. In order to achieve this operation, arm changing signals are required for the thyristors 12P, 12N and 13P, 13N. Again, the conduction phase is advanced to conduct the thyristors 13P and 13N is response to the conduction phase signal $\alpha$. In this case, it is necessary that the gate signals for the thyristors 12P and 12N be eliminated partly by the portion corresponding to the conduction phase signal $\alpha$ for the thyristors 13P and 13N. Also, the gate signals for the thyristors 11N and 11P have to be eliminated by the portion corresponding to the gate signal application to the thyristors 12P, 12N, 13P and 13N.

When, by the phase advance of the conduction phase signal $\alpha$ applied to the thyristors 13P and 13N, the thyristor unit U1 rectifies the whole voltages across the secondary windings $S_{11}$ and $S_{12}$ of the main transformer, the thyristor unit U2 is turned on so that the whole voltage across the secondary winding $S_2$ of the main transformer is rectified at a time, while at the same time returning the rectified voltage of the thyristor unit U1 to the initial state ($E_1 = 0$).

For the purpose of this changeover operation, a signal for changing the arms of the thyristor unit U1 (hereinafter referred to as signal $U_{12P}$) and a signal for turning on the thyristor unit U2 (hereinafter referred to as signal $U_{2P}$) are used, which signals have to be produced at zero phase of the AC source voltage. Further, it is necessary to produce a gate cut-off signal by detecting the generation of the signal $U_{2P}$ for turning on the thyristor unit U2.

This changeover operation causes a conduction phase signal of zero degree to be applied to the thyristors 22P and 22N of the thyristor unit U2. Since the thyristors 21P and 21N are cut off during the conduction of the thyristors 22P and 22N respectively, the gate signal must be eliminated during this period. Upon completion of this changeover operation, the DC voltage $E_1$ of the thyristor unit U1 is again increased gradually from zero.

The regenerative braking control operation will be explained below.

In response to a regenerative braking command, the thyristor units U1 and U2 both have to produce the maximum counter electromotive force. For this purpose, a signal of the maximum conduction phase angle (called $\alpha_{max}$) has to be applied to the thyristors 11P, 13P, 11N and 13N of the thyristor unit U1 and the four thyristors of the thyristor unit U2 in order to maintain the marginal angle for commutation in the inverter regenerative braking operation. Further, such a signal must be a "wide" signal with the length of 180° (this signal being called $\alpha_{MW}$).

With the reduction in speed, the counter electromotive force $E_1$ of the thyristor unit U1 is reduced correspondingly. For this purpose, it is necessary to apply the conduction phase signal $\alpha$ to the thyristors 12P and 12N of the thyristor unit U1 for commutation thereof from thyristors 13P and 13N respectively. The inverter operation is effected by the four thyristors including 12P, 12N, 11P and 11N, so that the counter electromotive force $E_1$ of the thyristor unit U1 is reduced to a level equivalent to the voltage across the secondary winding $S_{12}$ of the main transformer MT. Since the thyristor 11P (or 11N as the case may be) is cut off during the conduction of the thyristor 12P (or 12N as the case may be), this period has to be used for eliminating the gate signal for the thyristor 11P (or 11N as the case may be). Similarly, the thyristors 12P and 12N are cut off by the conduction of the thyristors 13P and 13N respectively, so that the former signals have to be eliminated by the signal portion corresponding to the signals for the thyristors 13P and 13N respectively.

When the conduction phase signal $\alpha$ advances and reaches zero, substantially the voltage across the secondary winding $S_{12}$ of the main transformer MT only is adapted to be inverted. During a short period of time when the thyristors 13P and 13N conduct, the voltage across the secondary winding $S_{11}$ of the main transformer MT is rectified. Therefore, it is necessary to completely cut off the thyristors 11P and 11N at this moment in such a manner that these two thyristor signals are eliminated while at the same time applying to the thyristors 12P and 12N a signal (called $\alpha MP$) produced from signal $\alpha_{max}$ through a one-shot multivibrator circuit. For this changeover operation, the signal $U_{12P}$ is used. In view of the importance of preventing commutation failure in an inverter mode or inverter, the changeover operation must be accomplished at a timing earlier by several tens of $\mu s$ required for changeover than the maximum conduction phase $\alpha_{max}$. This changeover operation enables the thyristor unit U1 to invert only the voltage applied across the secondary winding $S_{12}$ of the main transformer MT. In order to further reduce the resulting counter electromotive force, the conduction phase signal $\alpha$ must be applied to the thyistors 13P and 13N from the time point of generation of signal $U_{12P}$. In this case, the thyristors 12P and 12N are in cut-off state during the lengthened conduction period of the thyristors 13P and 13N, and therefore the signals applied to the thyristors 12P and 12N must be eliminated by that particular portion. When the counter electromotive force $E_1$ of the thyristor unit U1 becomes minimum as the conduction phase signal $\alpha$ becomes zero in conduction phase, the DC voltage $E_2$ of the thyristor unit U2 is reduced to zero, while at the same time returning the thyristor unit U1 to the initial condition ($E_1 = -E_{1m}$). In order to achieve this purpose, a DC gate signal must be applied to the thyristors 21P and 21N, while the gate signals for the thyristors 22P and 22N must be eliminated. The signal $U_{2P}$ is utilized for this changeover operation.

After this changeover operation, the counter electromotive force $Ed_1$ of the thyristor unit U1 is again reduced from a higher to a lower level.

If more stable operation characteristics are to be obtained in the powering control operation or regenerative braking control operation mentioned above, the armature current of the motor and the field current thereof are controlled. In other words, for the purpose of powering control, the armature current of the main motor is regulated constantly within a predetermined limit during acceleration. For the regenerative braking control which usually involves a shunt motor, on the other hand, the field current of the motor is first regulated, followed by the regulation of the armature current in order to assure effective use of the motor torque.

According to the present invention, the circuit current undergoes no sudden change when the thyristor arms of the continuously-controlled thyristor unit are changed over, and further converter and inverter operations are effected stably by a current control system.

Figure 4:
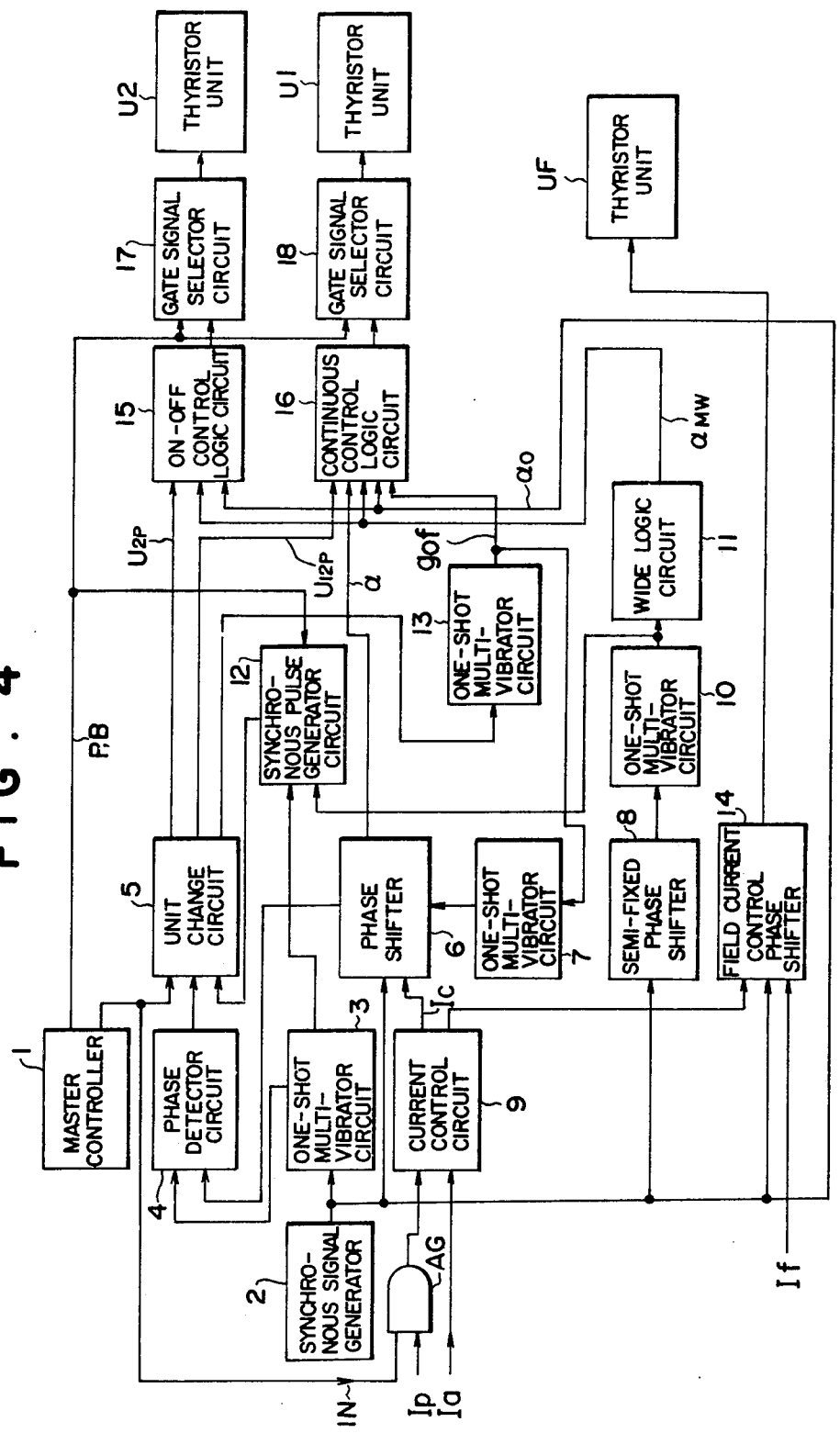
FIG. 4 is a block diagram showing the entire circuit arrangement of the power converter control apparatus according to the present invention.
Figure 5:
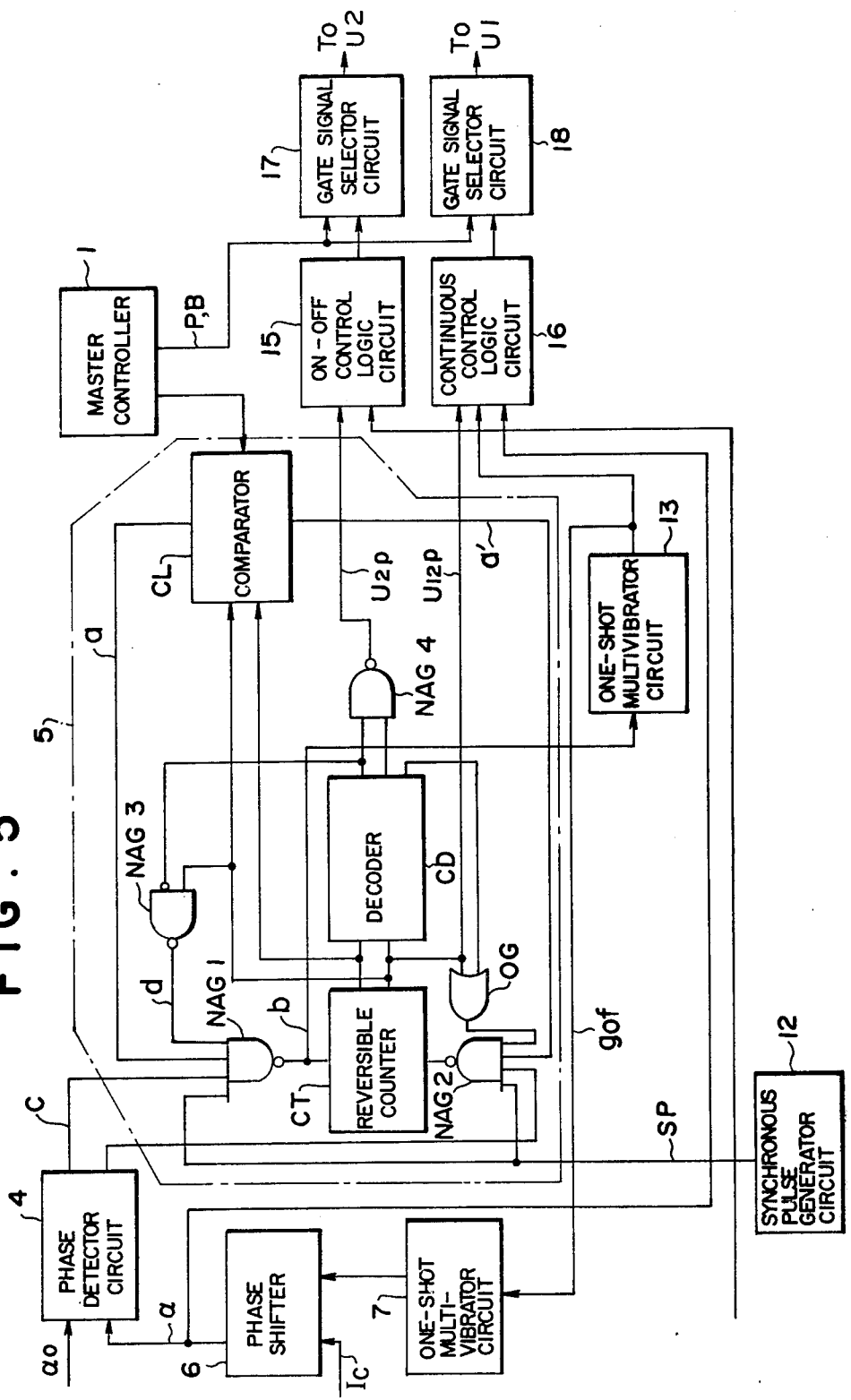
FIG. 5 is a diagram showing in detail the unit change circuit in FIG. 4.
Figure 6:
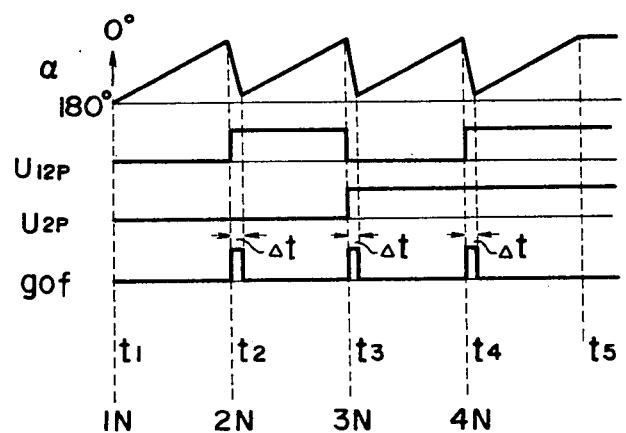
FIG. 6 is a diagram for explaining the operation of the circuit of FIG. 5.
Figure 8:
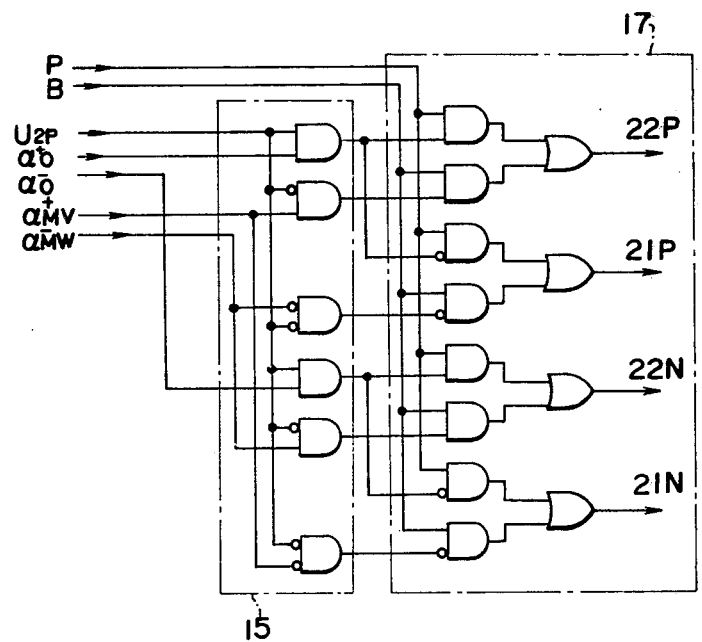
FIG. 8 is a diagram showing in detail a logic circuit for on-off control of the converter units in FIG. 4.
Figure 7:
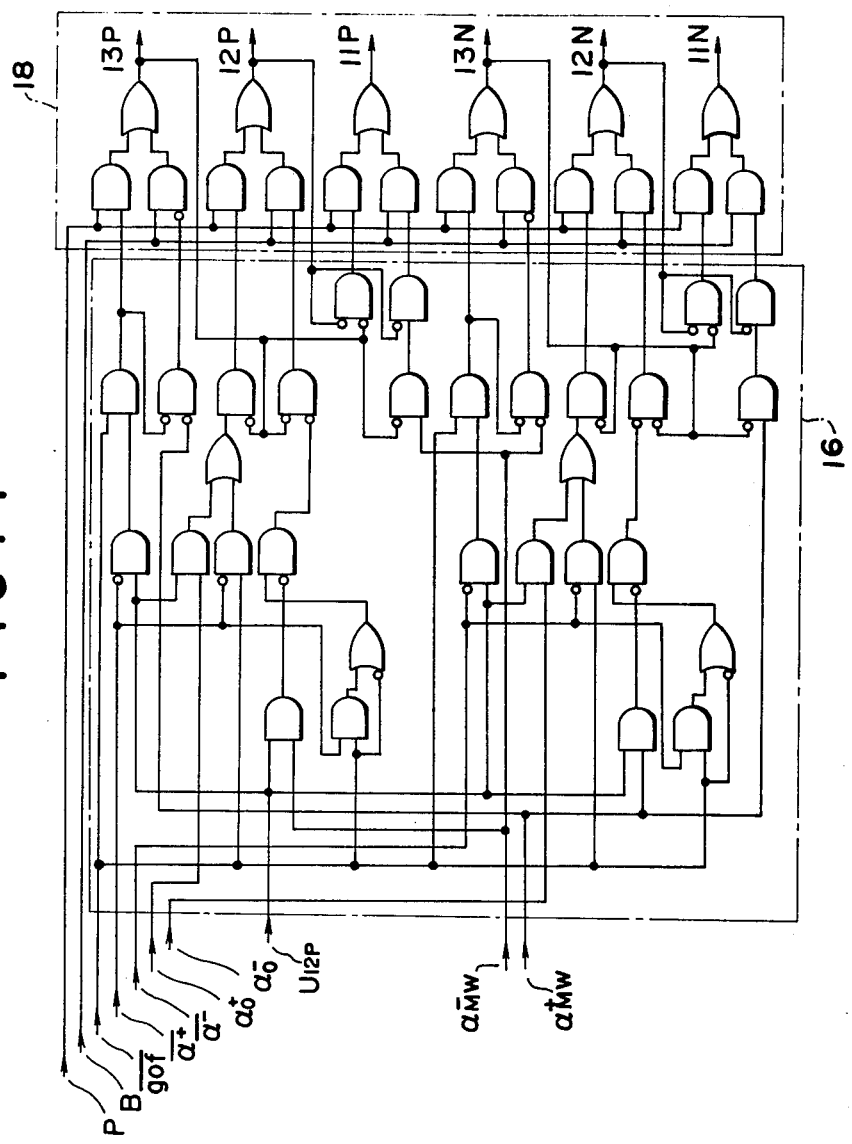
FIG. 7 is a diagram showing in detail a logic circuit for continuous control of the converter units in FIG. 4.
Figure 9:
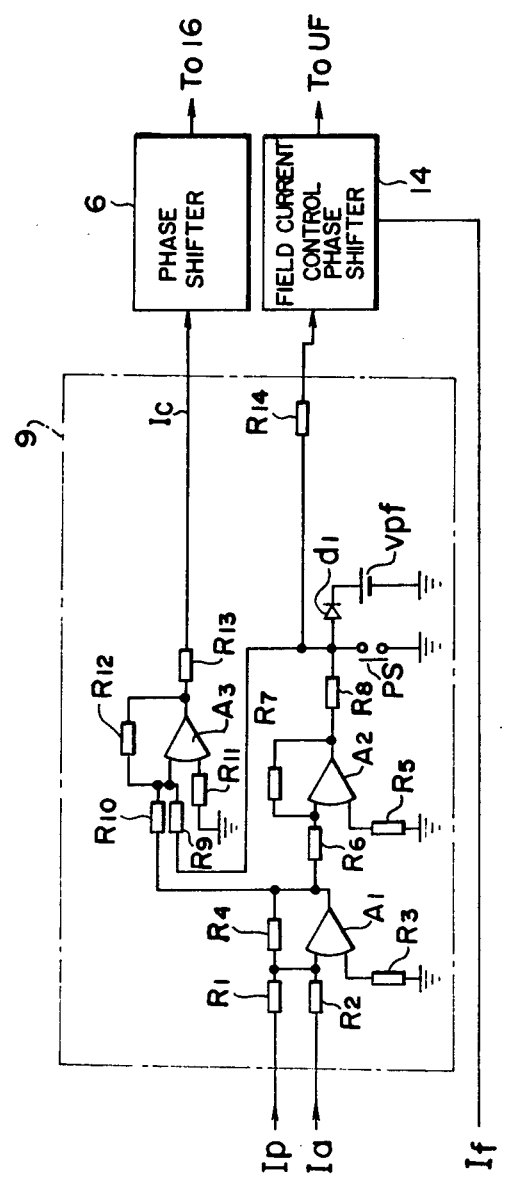
FIG. 9 illustrates in detail the current control circuit in FIG. 4.

A block diagram of an embodiment of the present invention is shown in FIG. 4, the detail of the unit change circuit in FIG. 5, the operation of the unit change circuit in FIG. 6, the detail of a gate signal logic section of the thyristor unit subjected to continuous control in FIG. 7, the detail of a gate signal logic section of the thyristor unit subjected to on-off control in FIG. 8, and the detail of the current control circuit in FIG. 9.

First, the power converter control apparatus shown in FIG. 1 will be described with reference to FIG. 4.

A master controller 1 is manually operated by the operator of an electric car. From the master controller 1, a command for instructing the number of the thyristor units to be rendered operative is applied to a unit change circuit 5, while regenerative braking commands P, B are applied to gate signal selector circuits 17 and 18. Since the operating command from the master controller 1 is applied to the AND gate AG, the current command Ip making up the standard value of the armature current is applied to the current control circuit 9. The current control circuit 9 produces an error between the current command Ip and the armature current Ia, and applies a control command Ic to the phase shifter 6. The phase shifter 6, in response to the control command Ic, determines the phase signal $\alpha$ of the thyristor unit U1 and applies the conduction phase signal $\alpha$ to the continuous control logic circuit 16. On the other hand, the current control circuit 9, which controls the current of the field magnet F only at the time of regenerative braking control, applies to the field current control phase shifter 14 a command making up a reference value of the field current.

Figure 2:
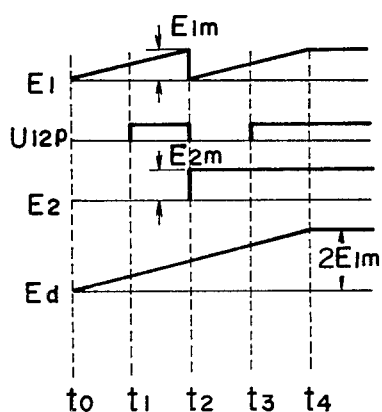

A synchronous signal generator 2 for producing a signal in synchronism with the power supply by converting the sine wave of the single-phase AC power supply supplied to the main transformer MT in FIG. 1 into a square wave applies to the phase shifters 6, 8 and 14 a signal making up a reference for producing a conduction phase signal. This signal also corresponds to the minimum conduction phase signal $\alpha_0$ of the thyristor unit and therefore is applied to the on-off control logic circuit 15 and to the continuous control logic circuit 16 at the same time. Further, the output of the synchronous signal generator 2 is applied to the one-shot multivibrator circuit 3 where it is converted into a pulse signal. With this pulse signal as a reference, the phase detector circuit 4 and the synchronous pulse generator circuit 12 are actuated.

The phase detector circuit 4 detects the phase of the conduction phase signal $\alpha$ from the phase shifter 6 with the synchronous pulse from the one-shot multivibrator 3 as a reference. When the phase reaches a minimum conduction phase $\alpha_0$ or a maximum conduction phase $\alpha_{max}$, the output of the phase detector circuit 4 is applied to the unit change circuit 5. Specifically, the count of the later-described reverse counter included in the unit change circuit 5 is increased at the minimum conduction phase $\alpha_0$ and reduced at the maximum conduction phase $\alpha_{max}$. The unit change circuit 5 is for generating an operation signal $U_{2P}$ for changing the number of thyristor units to be rendered operative and an arm changing signal $U_{12P}$ for the thyristor unit U1. The operation signals $U_{12P}$ and $U_{2P}$ are produced in synchronism with the power supply in accordance with the output of the synchronous pulse generator circuit 12.

The output of the unit change circuit 5, together with the outputs of the operation signals $U_{12P}$ and $U_{2P}$, is applied to the one-shot multivibrator circuit 13. The one-shot multivibrator circuit 13 produces a gate cut-off signal gof which is applied to the continuous control logic circuit 16. The logic circuit 16 cuts off the conduction phase signal $\alpha$ from the phase shifter 6 to the thyristor unit U1 during the period when the gate cut-off signal is being generated. Further, the gate cut-off signal gof from the one-shot multivibrator circuit 13 is applied to the one-shot multivibrator circuit 7, the output of which is used to restore the output of the phase shifter 6 from a minimum conduction phase $\alpha_0$ to a maximum conduction phase $\alpha_{max}$.

In order to maintain the marginal angle for commutation of the thyristors of the thyristor units U1 and U2 for regenerative braking control operation, a signal with a maximum conduction phase angle of $\alpha_{max}$ is required to be applied, which signal is produced by a semi-fixed phase shifter 8, a one-shot multivibrator 10 and a wide logic circuit. In other words, the semi-fixed phase shifter 8 produces the maximum condition phase signal $\alpha_{max}$ for setting the commutation marginal angle of the thyristors, with the output of the synchronous signal generator 2 as a reference. The maximum conduction phase signal $\alpha_{max}$ is converted into a pulse signal by the one-shot multivibrator circuit 10. The pulse signal from the one-shot multivibrator 10 is converted into a wide signal $\alpha_{MW}$ with an electrical width of 180° by the wide logic circuit 11. The output $\alpha_{MW}$ of the wide logic circuit 11 is applied to the on-off control logic circuit 15 and the continuous control logic circuit 16.

Next, the on-off control logic circuit 15 receives the unit operation signal $U_{2P}$, the minimum conduction phase signal $\alpha_0$ and the maximum conduction phase signal $\alpha_{MW}$ for logically producing a gate signal to each of the thyristors of the thyristor unit U2. The output signal of the logic circuit 15 is applied to a gate signal selector circuit 17, which in turn selects gate signals and distributes them among the thyristors of the thyritor unit U2 in response to a powering or regenerative braking control command from the master controller 1. The continuous control logic circuit 16, on the other hand, receives the arm changing operation signal $U_{12P}$, the minimum conduction phase signal $\alpha_0$, the maximum conduction phase signal $\alpha_{MW}$, the conduction phase signal $\alpha$ and the gate cut-off signal gof thereby to logically produce gate signals for the thyristors of the thyristor unit U1. The output signal of the logic circuit 16 is applied to the gate signal selector circuit 18, which selects gate signals and distributes them among the thyristors of the thyristor unit U1 in response to a powering or regenerative braking control command from the master controller 1.

The main component elements of the circuit of FIG. 4 will be described below with reference to FIGS. 5 and 6 which respectively show the detail of the unit change circuit and a base for explanation of the same circuit. In FIG. 5, reference character CT shows a reversible counter, character CD a decoder, character CL a comparator for comparing the output of the reversible counter CT with the command relating to the number of the thyristor unit to be rendered operative produced from the master controller 1 (hereinafter referred to as a notch command), characters $NAG_1$ to $NAG_4$ NAND gates, and characters OG or OR gate.

Assuming that no command is produced from the master controller 1, the output of the comparator CL is such that a = "0" and a' = "0", resulting from the output of the reversible counter CT in the absence of a notch command. These outputs cause the outputs b and b' of the NAND gates $NAG_1$ and $NAG_2$ to change to "1" thereby to prohibit the operation of the reversible counter CT, the NAND gates $NAG_1$ and $NAG_2$ being provided for increasing or decreasing the information stored in the reversible counter CT. Under this condition, assume that 1 notch 1N is ordered by the master controller 1 at time point $t_1$ in FIG. 1. The conditions for the AND gate AG are established as shown in FIG. 4, with the result that the gate AG produces an output to the current control circuit 9. Since $-Ia$ = "0", the output Ic is produced from the current control circuit 9 and applied to the phase shifter 6. The output $\alpha$ of the phase shifter 6, as shown in FIG. 6, advances from maximum conduction phase $\alpha_{max}$ ($\alpha$ = 180°) to minimum conduction phase $\alpha_0$ ($\alpha$ = 0) between $t_1$ and $t_2$, thereby controlling the thyristors of the thyristor unit U1 to cause current flow Ia in the main motor. When the output $\alpha$ of the phase shifter 6 becomes minimum (0 degree) at time point $t_2$ as shown in FIG. 6, the particular minimum conduction phase of $\alpha$ is detected by the phase detector circuit 4, which thus produces an output c of "1". The output a of the comparator CL, on the other hand remains unchanged at "0" since the notch command 1N is not applied to the comparator with the reversible counter output being equal to the notch command. The NAND gate $NAG_3$ is for providing a roadblock to the circumvention by the reversible counter CT, so that the output d of the NAND gate $NAG_3$ remains at "1" until the last output is produced from the reversible counter CT. The output SP of the synchronous pulse generator circuit 12 remains produced at power phase zero.

Under this condition, assume that a notch command 2N is given from the master controller 1 at time point $t_2$ in FIG. 6. The output a of the comparator changes to "1" because of the output of the reversible counter CT being equal to the notch command.

As a result, the inputs to the NAND gate $NAG_1$ are in such a relation that a = c = d = "1", and the output b thereof changes to "0" in synchronism with the synchronous pulse SP. The information stored in the reversible counter CT increases by one, so that the first bit output $U_{12P}$ of the reversible counter CT changes from "0" to "1" at time point $t_2$ in FIG. 6. This output $U_{12P}$ is also applied to the one-shot multivibrator 13, the output of which is in turn used to extinguish the conduction phase signal $\alpha$ of the thyristor unit U1. Thus the gate cut-off is effected, while at the same time applying a signal to the phase shifter 6 thereby to return the conduction phase angle $\alpha$ from a minimum to a maximum angle quickly through the one-shot multivibrator circuit 7. The gate cut-off time $\Delta t$ must be at least as long as required for this conduction phase restoration of the phase shifter 6. When the output of the phase shifter is restored from a minimum to a maximum conduction phase, the output c of the phase detector circuit 4 becomes "0", while the output a of the comparator CL changes to "0" because of the reversible counter output being equal to the notch command, thereby prohibiting the operation of the reversible counter CT.

Under this condition, the conduction phase signal $\alpha$ which has been restored to a maximum conduction phase is again advanced to a minimum conduction phase by the signal Ic given by the current control circuit as shown between $t_2$ and $t_3$ in FIG. 6. When the conduction phase signal $\alpha$ reaches a minimum conduction phase, it is again detected by the phase detector circuit 4 and the output thereof c changes to "1". Upon application of the notch command 3N from the master controller 1 at time point $t_3$ in FIG. 6, the output a of the comparator changes to "1", with the result that the gate of the reversible counter opens again in synchronism with the synchronous pulse SP, thus increasing the stored information by one. This operation eliminates the signal $U_{12P}$ which has thus far been produced, and the ON signal $U_{2P}$ for the thyristor unit U2 changes to "1". At the same time, the gate of the thyristor unit U1 is cut off and the conduction phase signal $\alpha$ is restored from a minimum to a maximum conduction phase in order to prevent a sudden change in the main circuit current which otherwise might occur at the time of changing the thyristor units. Similar operations are repeated for orderly control till time point $t_5$ in FIG. 6, where the thyristor unit operation signals are in such a relation that $U_{12P} = U_{2P} =$ "1".

The foregoing description refers to the case where the notch command is increased one by one through the master controller 1, although it is sometimes increased from zero to maximum (4N) in one step for such control operation as the electric car. In such a case, too, the control operation is accurately effected from $t_1$ to $t_5$ as shown in FIG. 6.

Unlike these notch commands, it sometimes occur that the notch command produced by the master controller 1 is decreased from maximum (4N) to minimum for control purpose. In such a case, too, the operation between $t_1$ and $t_5$ as shown in FIG. 6 is followed reversely for control. In this case, it will be seen from FIG. 5 that in view of the fact that the input of the one-shot multivibrator 13 uses signal b for increasing the information stored in the reversible counter CT, no gate cut-off is effected when decreasing the information stored in the reversible counter CT. The arm changing signal $U_{12P}$ for the thyristor unit U1 and the arm changing signal $U_{2P}$ for the thyristor unit U2 may of course be used in an inverter mode as well as in a converter mode.

The continuous control logic circuit 16 and the gate signal selector circuit 18 will be explained below with reference to FIG. 7. In FIG. 7, reference character P shows a powering command generated from the master controller 1, character B a regenerative braking command generated from the master controller 1, character g of a reversing signal generated from the one-shot multivibrator circuit 13 for the gate cut-off signal $\overline{g}$ of. Characters $\alpha^+ \alpha^-$ designate inverted signals for the conduction phase signal $\alpha$ from the phase shifter 6, the symbols + and - respectively indicating positive and negative half cycles of the power supply. Characters $\alpha_0^+$ and $\alpha_0^-$ are a minimum conduction phase signals $\alpha_0$ from the synchronous signal generator 2, the symbols + and - representing positive and negative half cycles of the power supply respectively. Character $U_{12P}$ shows an arm-changing operation signal produced from the unit changing circuit 5. Characters $\alpha_{MW}^+$ and $\alpha_{MW}^-$ designate a maximum conduction phase signals $\alpha_{max}$ produced from the wide logic circuit 13, signal $\alpha_{MW}^+$ being in advance of $\alpha_0^-$ in phase by the commutation marginal angle, signal $\alpha_{MW}^-$ being in advance of $\alpha_0^+$ in phase by the commutation marginal angle.

The gate signals applied to the thyristor unit U1 from the circuits 16 and 17 in FIG. 7 are shown in logic form below.

In the case of powering control:

$$11P = (\overline{12P + 13P}) \cdot P, \ 11N = (\overline{12N + 13N}) \cdot P$$

$$12P = \{(\alpha^+ \cdot \overline{gof} + \alpha_0^+ \cdot U_{12P})\overline{13P}\} \cdot P$$

$$12N = \}(\alpha^- \cdot \overline{gof} + \alpha_0^- \cdot U_{12P})\overline{13N}\} \cdot P$$

$$13P = (\alpha^+ \cdot \overline{gof} \cdot U_{12P}) \cdot P$$

$$13N = (\alpha^- \cdot \overline{gof} \cdot U_{12P}) \cdot P$$

In the case of regenerative braking control:

$$11P = \}\alpha_{MW}^- \cdot (\overline{12P + 13P})\} \cdot B$$

$$11N = \}\alpha_{MW}^- \cdot (\overline{12N + 13N})\} \cdot B$$

$$12P = \}(gof + \alpha^+) \cdot (U_{12P}\alpha_{MW}^-) \cdot \overline{13P}\} \cdot B$$

$$12N = \}(gof + \alpha^-) \cdot (U_{12P}\alpha_{MW}^+) \cdot \overline{13N}\} \cdot B$$

$$13P = \}(\alpha^+ \cdot \overline{gof} \cdot U_{12P}) + \alpha_{MW}^+\} \cdot B$$

$$13N = \}(\alpha^- \cdot \overline{gof} \cdot U_{12P}) + \alpha_{MW}^-\} \cdot B$$

The on-off control logic circuit 15 and the gate signal selector circuit 17 are also similarly constructed as shown in FIG. 8 and their gate signals are expressed logically below.

In the case of powering control:

$$21P = (P \cdot \overline{22P}) \cdot P, \ 21N = (P \cdot \overline{22N}) \cdot P$$

$$22P = (\alpha_0^+ \cdot N_{2P}) \cdot P$$

$$22N = (\alpha_0^- \cdot U_{2P}) \cdot P$$

In the case of regenerative braking control:

$$21P = (\alpha_{MW}^- + U_{2P}) \cdot B$$

$$21N = (\alpha_{MW}^- + U_{2P}) \cdot B$$

$$22P = (\alpha_{MW}^+ \cdot \overline{U_{2P}}) \cdot B$$

$$22N = (\alpha_{MW}^- \cdot \overline{U_{2P}}) \cdot B$$

As seen from the foregoing description, the outputs from the continuous control logic circuit and the on-off control logic circuit are applied to the gate control signal selector circuits 17 and 18 and switched by the powering control signal P and the regenerative braking control signal B.

The operation of the current control circuit 9 for assuring safe operation will be explained with reference to the detailed diagram of FIG. 9.

In the case of powering control, no field current control is effected, so that the switch PS connected at the output side of the amplifier $A_2$ is kept closed in order not to apply the field current reference voltage Vpf. Now, assume that a powering command signal is applied and the armature current reference value Ip is applied to the amplifier $A_1$. Since the output of the amplifier $A_2$ is shorted to zero through the switch PS, the input of the amplifier $A_3$ in the next stage takes the form of output voltage of the amplifier $A_1$ itself, so that the amplifier $A_3$ produces an output Ic at an amplification factor determined by the resistor $R_{12}$ and applies it to the phase shifter 6.

When the output α is produced from the phase shifter 6 in response to the signal Ic, the armature current Ia flows thereby to start the motor. If the armature current Ia is applied to the amplifier $A_1$ in negative form —Ia, comparison with the armature current reference value Ip causes the armature current Ia to control all the thyristor units by sequential continuous control through the output α of the phase shifter 6, thereby continuing stable control until the composite DC voltage reaches its maximum value. After that, what is called a free acceleration area is entered where the main motor is accelerated for steadily reducing armature current.

In response to a regenerative braking command, on the other hand, the armature current reference value Ip is applied to the amplifier $A_1$ the output of which is applied to the amplifiers $A_2$ and $A_3$ in the next stage. Since the switch PS opens in the regenerative braking operation, the output of the amplifier $A_2$ increases to reach the field current reference value Vpf and is applied to the field current control phase shifter 14. Even though the outputs of the amplifiers $A_1$ and $A_2$ are applied to the amplifier $A_3$, the fact that they are opposite in polarity prevents the input Ic to the armature current control phase shifter 6 from being produced as an output thereof until the output of the amplifier $A_2$ is saturated to the field current reference value Vpf. In the regenerative braking control operation, therefore, the field current is first controlled, followed by the control of the armature current, thus preventing commutation failure for safe operation. The stable control of the armature current and field current are similar in principle to the powering control.

It will be understood from the foregoing description that by appropriately controlling the thyristor units U1 and U2, a sudden change in current at the time of thyristor arm changing or unit changing for powering control or regenerative braking control is prevented, which coupled with current control, assures smooth operation characteristics.

We claim:

1. A power converter control apparatus for effecting powering control and regenerative braking control of a DC motor, comprising a DC motor functioning as a series motor for powering control and a separately-excited generator for regenerative braking control, a first converter unit connected in series to said DC motor in DC fashion and continuously controlling an output thereof for supplying power to said DC motor, a second converter unit connected in series between said first converter unit and said DC motor and effecting on-off control of said output, a third converter unit for controlling a field current of said DC motor only for regenerative braking control, a current control circuit for receiving a current command and an armature current, said current control circuit controlling the armature current in response to said current command, a first phase shifter for supplying a conduction phase signal to said first converter unit in response to an output from said current control circuit, a second phase shifter for receiving an output from said current control circuit and the field current, said second phase shifter producing a conduction phase signal for controlling the field current, a master controller for generating a command for instructing the number of said first and second converter units to be rendered operative and powering and regenerative braking control, a unit change circuit for applying a unit changing operation signal to said first and second converter units in response to the command for instructing the number of converter units to be rendered operative generated from said master controller and an output from said first phase shifter, a gate cut-off circuit for receiving an output of said unit change circuit, said gate cut-off circuit cutting off the application of the output of said first phase shifter to said first converter unit for a predetermined length of time, said gate cut-off circuit restoring the phase of said first phase shifter, means for producing a minimum and a maximum conduction phase signals from a signal in synchronism with a power supply, first logic means for receiving the output of said unit change circuit, the output of said first phase shifter, the output of said gate cut-off circuit, said maximum and minimum conduction phase signals, said first logic means for logically producing a gate signal to be applied to said first converter unit, in response to powering and regenerative braking control commands from said master controller, and second logic means for receiving the output of said unit change circuit and the minimum and maximum conduction phase signals, said second logic means logically producing a gate signal to be applied to said second conduction unit, in response to powering and regenerative braking control commands from said master controller.

2. A power converter control apparatus according to claim 1, in which said first rectifier unit comprises three arms including six thyristors in bridge for effecting arm changing operation in response to an output from said unit changing circuit, said second converter unit comprising two arms including four thyristors in bridge.

3. A power converter control apparatus according to claim 1, in which said unit change circuit includes a reversible counter for changing the count therein and making counts up to the command for instructing the number of converter units to be rendered operative generated from said master controller, when the output from said first phase shifter reaches selected one of a minimum and a maximum level, said unit changing operation signal being produced each time the count in said reversible counter is changed.

4. A power converter control apparatus according to claim 1, in which said first logic means includes a first logic circuit for producing a gate signal in response to the output of said unit change circuit, the output of said first phase shifter and the output of said gate cut-off circuit at the time of powering control operation, said first logic circuit producing a gate signal in response to the output of said unit change circuit, the output of said first phase shifter, the output of said gate cut-off circuit and said maximum conduction phase signal at the time of regenerative braking control operation, and a first selector circuit for correspondingly and respectively selecting one of the outputs from said first logic circuit and said second logic circuit in response to the powering control and regenerative braking control commands.

5. A power converter control apparatus according to claim 1, in which said second logic means includes a second logic circuit for producing a gate signal in response to the output of said unit change circuit and the maximum conduction phase signal at the time of powering control operation, said second logic circuit producing a gate signal in response to the output of said unit change circuit and the maximum conduction phase signal at the time of regenerative braking control operation, and a second selector circuit for selecting the output from said second logic circuit in accordance with the powering command and the regenerative braking control command.

6. A power converter control apparatus according to claim 1, in which said current control circuit includes a first amplifier for producing an error between a current command and the armature current, a second amplifier for applying to said second phase shifter a signal for controlling the field current in response to the output of said first amplifier, a switch for preventing the output of said second amplifier from being applied to said third converter unit during the powering control, limiter means for preventing the output of said second amplifier from exceeding a field current reference level, and a third amplifier for applying to said first phase shifter a signal for controlling the armature current in response to the outputs of said first and second amplifiers.

* * * * *